US012770513B1

(12) United States Patent
Dama et al.

(10) Patent No.: US 12,770,513 B1
(45) Date of Patent: *Oct. 20, 2026

(54) PREDICTING PARKING AVAILABILITY

(71) Applicant: United Services Automobile Association (USAA), San Antonio, TX (US)

(72) Inventors: Nikhil Dama, Apex, NC (US); Laura Frisbie Evans, Roswell, GA (US); Christopher Ryan Haberland, Seattle, WA (US); Ting Lu, San Antonio, TX (US); Simon Phillip Stolarczyk, San Antonio, TX (US); Kristopher Thomas Williams, Helotes, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 56 days.

This patent is subject to a terminal disclaimer.

(21) Appl. No.: 18/955,270

(22) Filed: Nov. 21, 2024

Related U.S. Application Data

(63) Continuation of application No. 18/432,583, filed on Feb. 5, 2024, now Pat. No. 12,183,202, which is a continuation of application No. 17/712,664, filed on Apr. 4, 2022, now Pat. No. 11,928,964.

(51) Int. Cl.
*G08G 1/14* (2006.01)
*G06F 16/9537* (2019.01)
*G06Q 50/40* (2024.01)

(52) U.S. Cl.
CPC ......... *G08G 1/148* (2013.01); *G06F 16/9537* (2019.01); *G06Q 50/40* (2024.01)

(58) Field of Classification Search
CPC ..... G08G 1/148; G06F 16/9537; G06Q 50/40
USPC ........................................................ 340/932.2
See application file for complete search history.

(56) References Cited

U.S. PATENT DOCUMENTS

| | | | | |
|---|---|---|---|---|
| 10,331,495 | B2 | 6/2019 | Bequet et al. | |
| 10,832,574 | B1 | 11/2020 | Agarwal et al. | |
| 11,928,964 | B1 * | 3/2024 | Dama | G06F 16/9537 |
| 12,132,669 | B1 | 10/2024 | Sharma et al. | |

(Continued)

OTHER PUBLICATIONS

Kouwenberg et al., Model Uncertainty and Exchange Rate Forecasting, The Journal of Financial and Quantitative Analysis, Feb. 2017, vol. 52, No. 1, pp. 341-363.

*Primary Examiner* — Kerri L McNally

(74) *Attorney, Agent, or Firm* — Potomac Law Group, PLLC; Dannon G. Allbee

(57) ABSTRACT

A parking availability predictor system provides a prediction of parking availability that meets a user's specified needs. When the user submits a query for parking availability, he can include desired parking criteria such as location, handicapped status, and desired time to begin parking. The system consults a parking occupancy model which gathers current and historical information about parking occupancy, including parking durations and durations of vacancies between occupancies. The model processes the gathered information into a statistical predictor of parking occupancy and vacancy. The system uses the predictor to predict when parking that meets the user's needs will become available. That prediction, including user-suitable parking locations along with the expected start of their vacancies, is then sent to the user in answer to his query.

20 Claims, 7 Drawing Sheets

(56) References Cited

U.S. PATENT DOCUMENTS

| | | | | |
|---|---|---|---|---|
| 12,183,202 | B1 * | 12/2024 | Dama | G08G 1/143 |
| 2007/0055477 | A1 | 3/2007 | Chickering et al. | |
| 2007/0087756 | A1 | 4/2007 | Hoffberg | |
| 2008/0255887 | A1 | 10/2008 | Gruter | |
| 2013/0083063 | A1 | 4/2013 | Geisner et al. | |
| 2013/0198737 | A1 | 8/2013 | Ricci | |
| 2014/0214319 | A1 | 7/2014 | Vucetic et al. | |
| 2015/0302667 | A1 | 10/2015 | Punjabi et al. | |
| 2015/0371541 | A1 | 12/2015 | Korman | |
| 2017/0228899 | A1 | 8/2017 | Witriol et al. | |
| 2017/0270793 | A1 * | 9/2017 | Scofield | G08G 1/141 |
| 2018/0054721 | A1 | 2/2018 | Choe et al. | |
| 2018/0121888 | A1 | 5/2018 | O'Reilly | |
| 2018/0313661 | A1 | 11/2018 | Eyster et al. | |
| 2018/0349792 | A1 | 12/2018 | Zhao et al. | |
| 2019/0102798 | A1 | 4/2019 | Jain et al. | |
| 2019/0236951 | A1 * | 8/2019 | Mason | G08G 1/146 |
| 2020/0090516 | A1 | 3/2020 | Sert et al. | |
| 2020/0152061 | A1 | 5/2020 | Adelsberger et al. | |
| 2020/0211390 | A1 | 7/2020 | Gerber | |
| 2020/0311615 | A1 | 10/2020 | Jammalamadaka et al. | |
| 2020/0311848 | A1 | 10/2020 | Weldemariam et al. | |
| 2021/0150418 | A1 | 5/2021 | Amrouss et al. | |
| 2021/0193302 | A1 | 6/2021 | Day et al. | |
| 2021/0201274 | A1 | 7/2021 | O'Brien et al. | |
| 2021/0256768 | A1 | 8/2021 | Zhao et al. | |
| 2021/0258722 | A1 | 8/2021 | Miller | |
| 2022/0019634 | A1 | 1/2022 | Allison et al. | |
| 2022/0076282 | A1 | 3/2022 | Monassebian et al. | |
| 2022/0092979 | A1 | 3/2022 | Gambella et al. | |
| 2022/0164895 | A1 | 5/2022 | Beckwith et al. | |
| 2022/0198438 | A1 | 6/2022 | Fiesinger | |
| 2023/0072718 | A1 | 3/2023 | Bond et al. | |
| 2023/0111384 | A1 | 4/2023 | Byers et al. | |
| 2023/0123916 | A1 | 4/2023 | Wyatt et al. | |
| 2023/0137256 | A1 * | 5/2023 | Chien | G08G 1/143<br>340/932.2 |
| 2023/0267551 | A1 | 8/2023 | Breitweiser et al. | |
| 2023/0273822 | A1 | 8/2023 | Ortiz et al. | |
| 2023/0281722 | A1 | 9/2023 | Westhues et al. | |
| 2023/0289744 | A1 | 9/2023 | Johnson | |
| 2023/0316417 | A1 | 10/2023 | Leise | |
| 2023/0334438 | A1 | 10/2023 | Horstmann | |
| 2024/0112789 | A1 | 4/2024 | Boonn et al. | |
| 2024/0118929 | A1 | 4/2024 | Meng et al. | |
| 2024/0323140 | A1 | 9/2024 | Harakas | |
| 2025/0094879 | A1 | 3/2025 | Zhao | |

* cited by examiner

PREDICTING PARKING AVAILABILITY

CROSS-REFERENCE TO RELATED APPLICATIONS

This application is a continuation of U.S. application Ser. No. 18/432,583, filed Feb. 5, 2024, titled "Predicting Parking Availability," currently pending which is a continuation of U.S. application Ser. No. 17/712,664, filed Apr. 4, 2022, titled "Predicting Parking Availability," now U.S. Pat. No. 11,928,964, issued Mar. 12, 2024, both of which are herein incorporated by reference in their entirety.

TECHNICAL FIELD

The present disclosure is directed to automated systems that gather current and past parking data and generate predictions of parking availability.

BACKGROUND

Finding parking in a busy location can be very frustrating. The frustration increases when a driver's particular needs, such as for handicapped parking within 30 feet of a Chinese restaurant, reduce the amount of suitable parking. When a suitable space is occupied with no other vacant suitable spaces around, the driver may choose to wait until the space opens up or may instead choose to drive somewhere else in hopes of finding a vacancy. However, facing this choice only adds to the driver's frustration because most drivers cannot call on any information for making an informed choice of how best to find suitable parking in the shortest amount of time.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
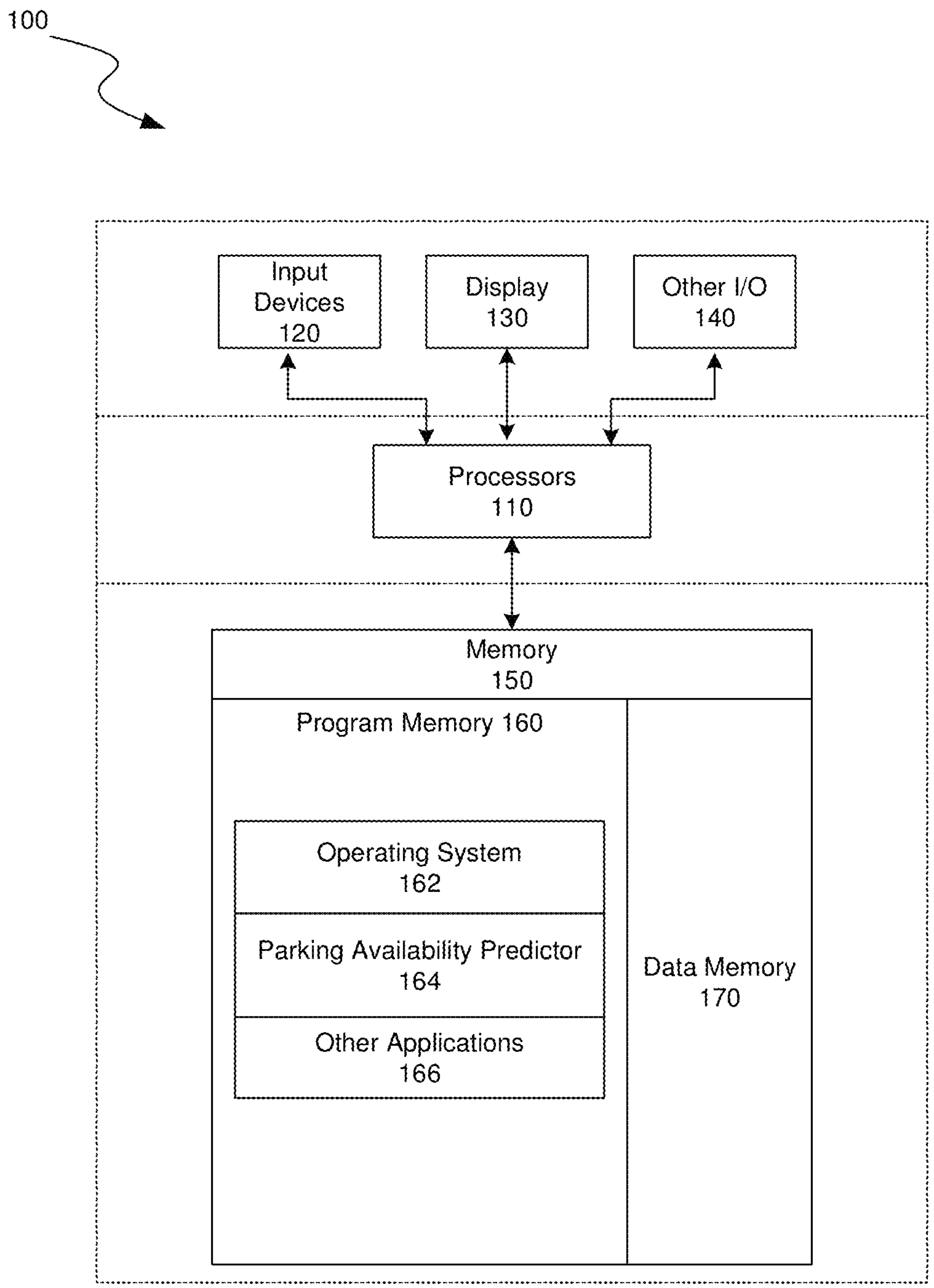
FIG. 1 is a block diagram illustrating an overview of devices on which some implementations can operate.

Aspects of the present disclosure are directed to a parking availability predictor system for providing a prediction of parking availability that meets a user's specified needs. When the user submits a query for parking availability, he can include desired parking criteria such as location, handicapped status, and desired time to begin parking. The parking availability predictor system consults a parking occupancy model which gathers current and historical information about parking occupancy, including parking durations and durations of vacancies between occupancies. The model processes the gathered information into a statistical representation of probable parking occupancy and vacancy. The parking availability predictor system uses the occupancy model to predict when parking that meets the user's needs will become available. That prediction, including suitable parking locations along with the expected start of their vacancies, is then sent to the user in answer to his query.

The parking availability predictor system can be accessed when a user submits a parking availability query and receives the prediction using any known technology. In some variations, an application running on the user's personal computer or smart phone allows the user to select search criteria and associated importance ratings, possibly storing these in a profile for repeated use. In addition, a user can specify absolute filtering criteria that can be applied before any predictions are returned to the user. As one example, a handicapped driver or driver with a handicapped passenger may allow handicapped parking to be returned in the predictions, while a prediction for a non-handicapped driver would not include handicapped parking. The application's user interface (UI) can be graphical which allows for map-based selection of desired locations and presentation of the results. An example of this is presented below in FIG. 6 and the accompanying text. Some variations support a text or voice UI. In some variations, the returned prediction can be fed into, or the user's query and response application can be integrated into, a navigational device in a smart phone or automobile.

A parking occupancy model supports the parking availability predictor system. In order to support the parking availability system in providing predictions suited to each user's search criteria, the parking occupancy model, in some variations, includes relatively static characteristics about parking places such as size, a location of the place, whether the place is for handicapped parking, whether the place is for automobile or motorcycle parking, whether the place is well lighted, whether the place is covered, whether the place requires payment, whether the place is secured, a safety rating for the place, or whether overnight parking is allowed. Such static parking characteristics can be obtained from various sources such as city planning information, parking business providing parking information for the spaces they manage, analysis of images of the parking spaces by machine learning models trained to identify parking space characteristics, manual tagging of parking spaces, crowd sourced information of users supplying parking space characteristics as the parking availability predictor system is used, etc.

In addition to the relatively static parking characteristics listed above, the parking occupancy model processes information about parking occupancy. This information can be gathered from special purpose parking sensors, street cameras, car-tracking devices, and other sources. The parking occupancy model uses this information in at least two ways. First, the information allows the parking occupancy model to tell whether a parking place is currently occupied or vacant and for how long it has been occupied or vacant. Second, the parking occupancy model accumulates such information over time and processes it into a statistical representation that tells how long a given parking place tends to remain occupied and how long it tends to remain vacant. For example, the occupancy model can know that people parking in front of a given restaurant tend to park on average for about two hours. The representation can be trained via machine-learning or by traditional statistical techniques.

When the parking availability predictor system receives a search query from a user, it consults the parking occupancy model. Potential parking is filtered by whatever parking characteristics the user includes in the query, the filtering in some variations informed by the importance ratings the user assigned to search criteria. The occupancy model allows the parking availability predictor system to predict when suitable parking will become available. Building on the example given above, if the occupancy model knows that people tend to park for two hours in front of a given restaurant, and if three user-suitable spaces in front of the restaurant have been occupied for almost two hours, then the occupancy model knows that suitable parking will probably become available at expected vacancy times calculated for each place as the difference between the expected parking duration (two hours) and the measured parking duration of each place's current occupancy.

The system prepares a parking availability prediction responsive to the user's query and delivers it to the user. The prediction can include locations of user-suitable parking along with predicted times of vacancy. In some variations, the prediction can also include locations of already vacant user-suitable parking. The prediction helps users to decide whether to wait for a space to open up or to drive elsewhere. The prediction also helps the user to know where to look if no suitable spaces are immediately available. For example, the parking availability prediction can identify an area (e.g., block, street, parking lot, etc.) in which the most spaces matching the search criteria are expected to be available in a threshold amount of time (e.g., 5 minutes).

No existing systems known to applicant provide predictions of parking availability nor enable search for parking with specific characteristics. Drivers are on their own to discover parking suitable to their needs that is currently vacant. Because drivers have no information about upcoming parking vacancies, they are often left to choose to wait for a space to open up or to drive around looking for a vacancy. The parking availability predictor system and methods disclosed herein are expected to overcome these deficiencies in existing systems. The system's occupancy model stores information about parking characteristics. In addition, the occupancy model receives vacancy and occupancy information over time and, from that historical information, builds a statistical representation that tells how long parking places tend to be occupied and how long they tend to be vacant. When queried by a user wanting to park, the system uses the occupancy model to reliably predict when parking suitable to the user will become available. The system's technological underpinnings make it more comprehensive than any previous system in predicting vacancies of currently occupied parking. Further, the automated aspects of these technologies, such as reliance on machine learning, allow building of the occupancy model with limited human input. The parking prediction system reduces the time spent by users in searching for parking and thus increases the utility of the systems on which it runs.

Several implementations are discussed below in more detail in reference to the figures. FIG. 1 is a block diagram illustrating an overview of devices on which some implementations of the disclosed technology can operate. The devices can comprise hardware components of a device 100 that predict parking availability. Device 100 can include one or more input devices 120 that provide input to the Processor(s) 110 (e.g., CPU(s), GPU(s), HPU(s), etc.), notifying it of actions. The actions can be mediated by a hardware controller that interprets the signals received from the input device and communicates the information to the processors 110 using a communication protocol. Input devices 120 include, for example, a mouse, a keyboard, a touchscreen, an infrared sensor, a touchpad, a wearable input device, a camera- or image-based input device, a microphone, or other user input devices.

Processors 110 can be a single processing unit or multiple processing units in a device or distributed across multiple devices. Processors 110 can be coupled to other hardware devices, for example, with the use of a bus, such as a PCI bus or SCSI bus. The processors 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The processors 110 can have access to a memory 150 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, parking availability predictor 164, and other application programs 166. Memory 150 can also include data memory 170, e.g., a model of parking occupancy, configuration data, settings, user options or preferences, etc., which can be provided to the program memory 160 or any element of the device 100.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
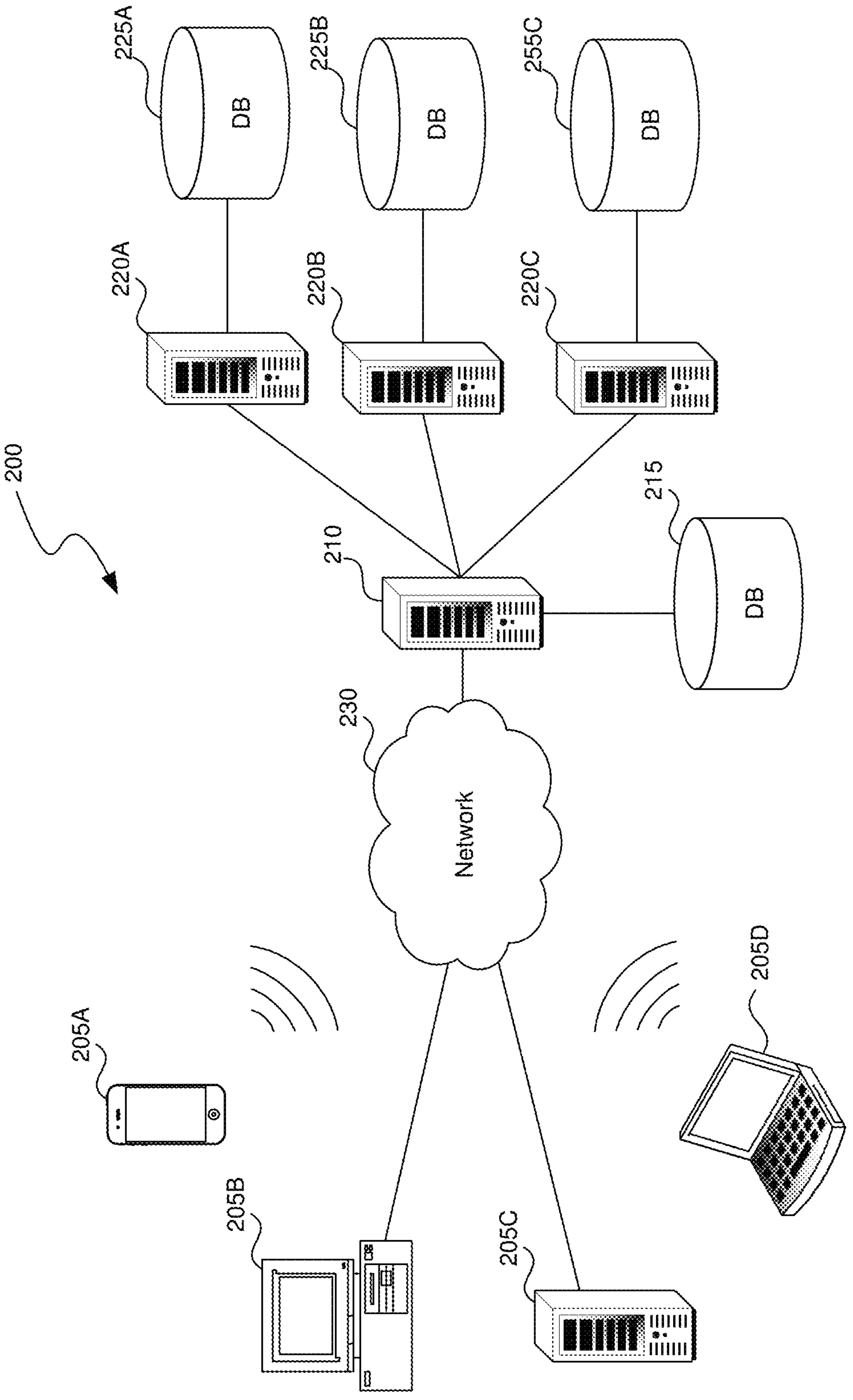
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g., store) information such as parking occupancy. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
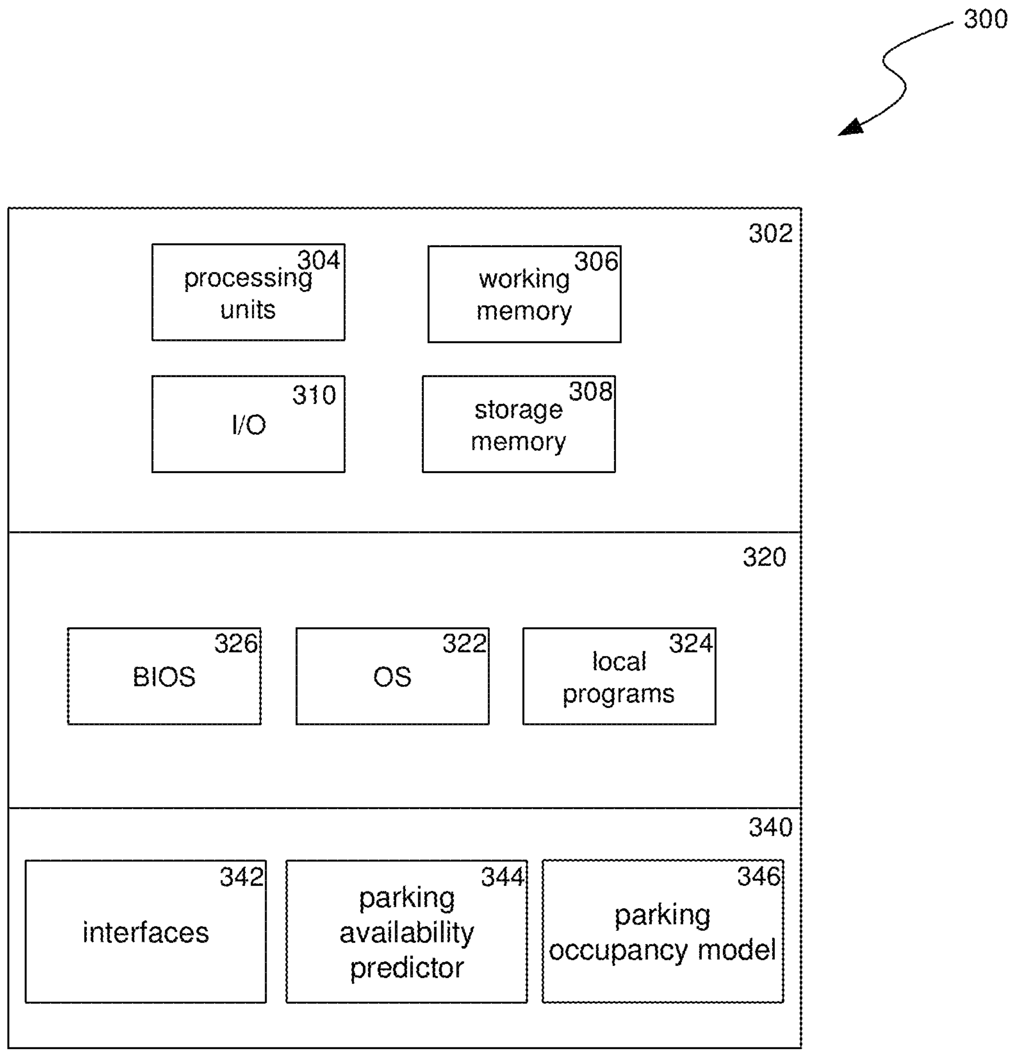
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include a parking availability predictor 344, a parking occupancy model 346, and components which can be used for providing user interfaces, transferring data, and controlling the specialized components, such as interfaces 342. In some implementations, components 300 can be in a computing system that is distributed across multiple computing devices or can be an interface to a server-based application executing one or more of specialized components 340. Although depicted as separate components, specialized components 340 may be logical or other nonphysical differentiations of functions and/or may be submodules or code-blocks of one or more applications.

The parking availability predictor 344 receives parking queries from users. A query can include parking criteria important to the requestor and importance rankings for those criteria. In various implementations, the criteria importance rankings can specify a range value (e.g., value between 1-5) allowing results to be ranked according to a match to the search criteria or a binary value e.g., specifying characteristics parking spaces mush have to be included in the search results. The parking availability predictor 344 consults the parking occupancy model 346. Using results from that consultation, the parking availability predictor 344 sends a response to the requestor's query with parking locations that satisfy the requestor's criteria along with predictions of when the locations will become vacant. In some variations, the prediction can also include locations of already vacant user-suitable parking. Additional details of the parking availability predictor 344 are provided below in reference to blocks 402 through 410 of FIG. 4.

The parking occupancy model 346 stores both mostly static and dynamic characteristics of parking, the mostly static criteria corresponding to the types of parking criteria that can be included in a request to the parking availability predictor 344. For the dynamic characteristics, the parking occupancy model 346 receives and processes information about parking occupancy. The parking occupancy model 346 accumulates this information over time and processes it to train a statistical representation that tells how long a given parking place tends to remain occupied and how long it tends to remain vacant. The representation can be trained via machine-learning or by traditional statistical techniques. The parking availability predictor 344 uses this information from the parking occupancy model 346 in order to make its predictions in response to user queries. Additional details of the parking occupancy model 346 are provided below in reference to blocks 502 through 508 of FIG. 5.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
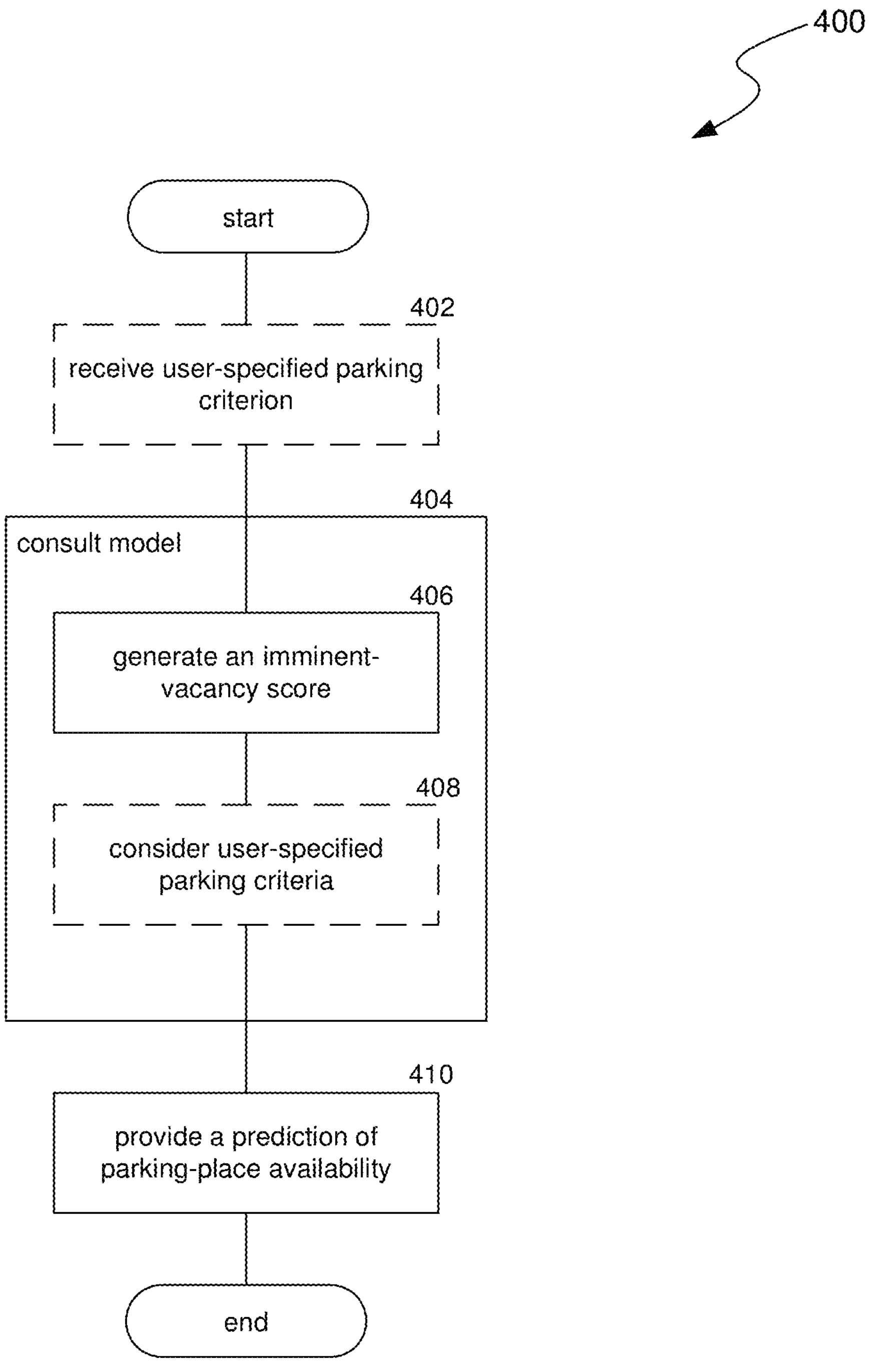
FIG. 4 is a flow diagram illustrating a process used in some implementations for predicting parking availability.

FIG. 4 is a flow diagram illustrating a process 400 used in some implementations for providing a prediction of parking availability. In some variations, process 400 begins when a user submits a query for parking information. See FIG. 6 and accompanying text for an example of an application interface for submitting a parking query. Process 400 can run on a server system and provide its prediction to a user's client device, e.g., a personal computer or smart phone or process 400 may execute on the client device.

While any block can be removed or rearranged in various implementations, block 402 is shown in dashed lines to indicate there are specific instances where block 402 is skipped. At block 402, process 400 receives user-supplied criteria for a desired parking place, e.g., a handicapped parking place within 30 feet of a Chinese restaurant becoming vacant at about 7:00 p.m. This information, if it is received, is used in block 408 described below. In some variations, the user-supplied criteria can include one or more of: when the user wishes to park, a minimum size of a parking place, a maximum distance from a user-specified location (specified either as an exact geographical location such as an address or GPS coordinates or a location type such as "a Chinese restaurant"), whether the place is for handicapped parking, whether the place is for automobile parking, whether the place is for motorcycle parking, whether the place is well lighted, whether the place is covered, whether the place requires payment, a payment price range, whether the place is secured, a minimum safety rating for the place, whether overnight parking is allowed, desired time to park, or any combination thereof. In some variations, this information may be automatically pulled from a user's profile. However, a particular query need not include any of these criteria. For example, if the occupancy model (see the example of FIG. 5 and accompanying text) only models parking availability in one unified parking structure, then the user need not specify a desired location for parking. Some variations may provide defaults for criteria not specified, e.g., process 400 assumes that the user wishes to park immediately if the query does not specify otherwise.

In some variations, the user's request of block 402 can associate an importance rating with a user-specified criterion. For example, the user can specify features a space must have to filter potential results in block 408 below and/or a user can specify desired but not required space characteristics to rank possible results in block 410 below. In some variations, the user's ratings or other user-specified criteria may be stored in a profile of the user and automatically sent with any parking search request unless explicitly overwritten by the user in making the parking search request. The user can also include absolute filtering criteria explicitly in the request or in the user profile.

Figure 5:
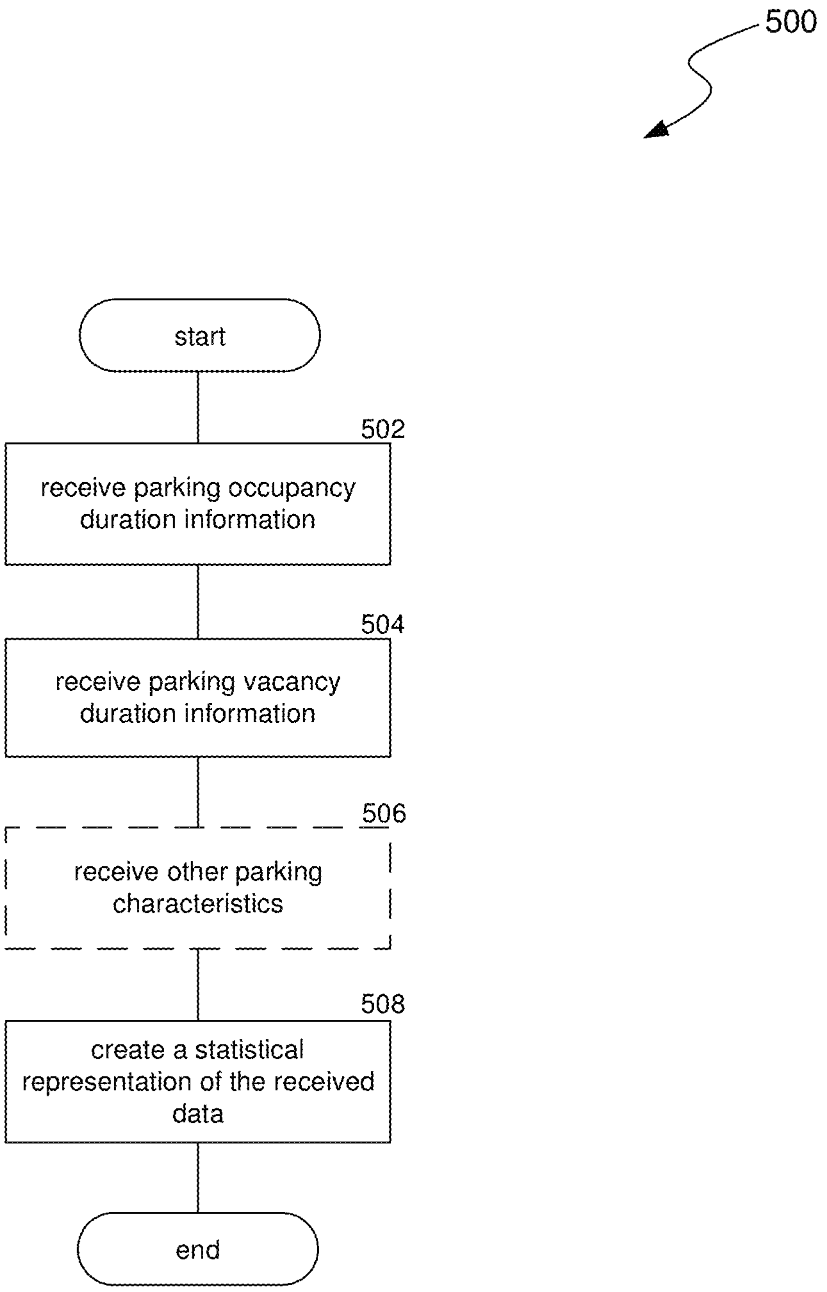
FIG. 5 is a flow diagram illustrating a process used in some implementations for building a model of parking occupancy.

At block 404, process 400 consults a parking occupancy model, an example of which is described in FIG. 5 and the accompanying text. In some variations, this consulting block 404 includes the two sub-blocks 406 and 408 as shown in FIG. 4. In other variations, sub-blocks 406 and 408 can be reversed in order. The order of 406 and 408 as shown in FIG. 4 represents a variation where process 400 applies the user-specified criteria to filter the results coming from the parking occupancy model, while a reverse order represents a variation where the filtering criteria are sent to the parking occupancy model which applies them to exclude non-matching spaces before determining relevant statistics.

At block 406, process 400 uses the parking occupancy model to create an imminent-vacancy score for the user's request. A higher score is correlated with a higher likelihood that the user will be able to park in user-suitable parking. In some variations, the imminent-vacancy score is based on dividing how long user-suitable parking is likely to remain vacant once the current occupant leaves by how long after the user arrives at the parking until that parking is expected to become vacant. The first factor, how long parking is expected to remain vacant, can be important in some situations where the occupancy model predicts that a parking place tends to remain vacant for only a very short amount of time. Such a short expected vacancy period decreases the likelihood that the user will be the first to arrive to park once the place becomes vacant. This lowers the score. When multiple user-suitable parking places are found by the parking occupancy model, the imminent-vacancy score can reflect that by, for example, summing individual scores from individual parking places. In other variations, the imminent-vacancy score can simply be a count of the number of user-suitable parking places expected to be vacant in a given area when the user needs to park. In some variations, an imminent-vacancy score as calculated above is multiplied by a probability factor that the score is correct and/or by a quality discounting factor if the score is based on fewer data points than average for the model. These factors are discussed below in reference to block 508 of FIG. 5. In some variations, the probability factor and/or the quality discounting factor are not merged into the imminent-vacancy score but are reported separately. See block 410 below.

While any block can be removed or rearranged in various implementations, block 408 is shown in dashed lines to indicate there are specific instances where block 408 is skipped, for example when the user's query does not include parking criteria. If the user specifies absolute filtering criteria, then potential parking is filtered by these absolute filtering criteria. For example, if the user only wants a handicapped spot, then non-handicapped parking is filtered out and will not appear in process 400's response to the query (see block 410). The filtering can be done either by the occupancy model itself in response to 400's consultation in block 404 or by process 400 after receiving results from the occupancy model.

Also in block 408, if the user includes an importance rating for a user-supplied criterion, process 400 can also used that rating to filter out potential parking. Parking that does not match a highly important criterion is left out of the results, while parking that satisfies many user-supplied criteria but fails to satisfy a lower-ranked criterion may be left in the results, especially when no better results are available.

Figure 6:
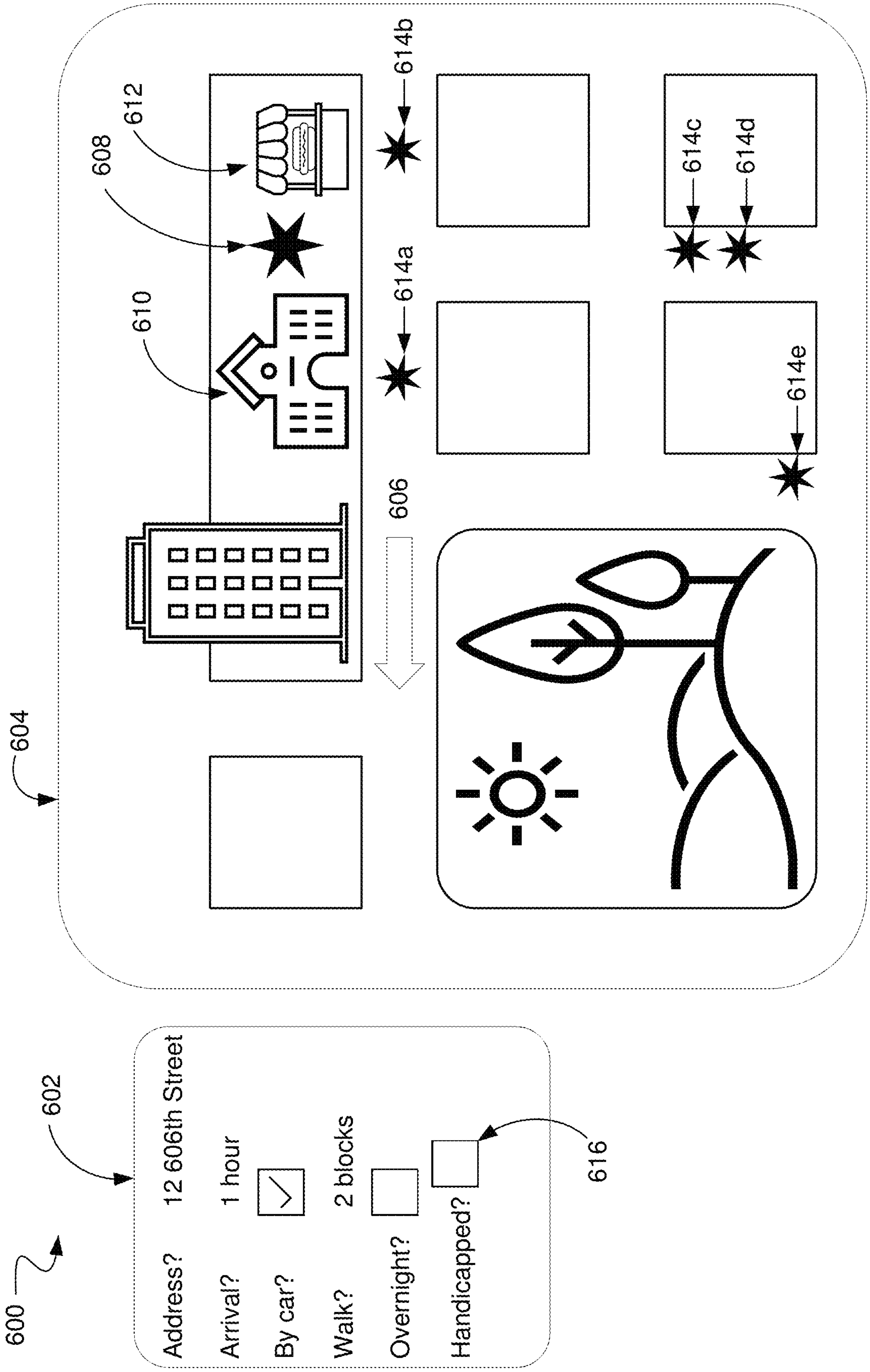
FIG. 6 is a conceptual diagram illustrating an example of an application providing parking availability information within a small city.

At block 410, process 400 uses the results from the occupancy model to provide a prediction of available parking. In some cases, the prediction includes the location and predicted time of vacancy of user-suitable parking along with the imminent-vacancy score. In some variations, the prediction includes the score's probability factor and/or quality discounting factor discussed above in relation to block 406. If for example, the parking place is rather new and thus has little occupancy and vacancy information associated with it, the prediction may give a 50% quality discounting factor to tell the user that this particular predication is less certain than others. In some variations, this prediction becomes part of the information presented by a parking-search application. The scenario 600 of FIG. 6 represents an example of this. In some variations, the parking predictions can be shown as a heatmap of the area near the user's desired parking location with warmer colors indicating a higher likelihood of user-suitable parking. In some variations, this prediction is sent to a subscribing user. For example, the user can subscribe to be notified whenever a parking place in front of a particular restaurant is likely to become available between 7:00 p.m. and 9:00 p.m. and to notify the user at least 20 minutes before the parking place is predicted to open. In some variations, the prediction can also include locations of already vacant user-suitable parking. In some variations, the returned prediction can be fed into, or the user's query and response application can integrated into, a navigational device in a smart phone or automobile. In some cases, the parking spaces identified as matching the user's search criteria can be returned with a corresponding ranking, where the ranking can be based on how well each space matches the user's preferences. For example, if the user specified lighted parking as very important and distance to a destination as moderately important, a list of resulting parking spaces can show a lighted spot that is further away from the user's entered address before a spot that is closer but not lit.

FIG. 5 is a flow diagram illustrating a process 500 used in some implementations for creating a model that statistically represents parking occupancy. Process 500 can be executed by a server system and run periodically, in response to a user command, or whenever a threshold amount of new parking data is available to be processed.

At block 502, process 500 receives current and historical information about how long a parking pace was occupied and adds that information to a parking occupancy model. For a current parking situation, this can include either a duration and/or a beginning time of a current occupation. This information can be gathered from special purpose parking sensors, street cameras, car-tracking devices, and other sources, all of which can attach timestamps to their output. Computer vision algorithms can be applied to the feeds from street cameras to detect whether a spot is occupied or vacant. The historical information can be tabulated or simply accumulated into a central tendency value, for example, an average duration of occupancy for the parking. This average can vary by hour of the day, day of the week, season, weather, or any other criteria available to the parking occupancy model that process 500 is building.

In a manner similar to that of block 502, at block 504, process 500 receives information about how long a parking place was vacant between occupancies. This information is also tabulated or accumulated into a central tendency.

While any block can be removed or rearranged in various implementations, block 506 is shown in dashed lines to indicate there are specific instances where block 506 is skipped, for example when the parking occupancy model only models parking in one unified parking structure. Generally, however, in block 506 process 500 gathers mostly static characteristics of parking places (in contrast to the dynamic information received in blocks 502 and 504) including one or more of: size, a location of the place, whether the place is for handicapped parking, whether the place is for automobile parking, whether the place is well lighted, whether the place is covered, whether the place requires payment, whether the place is secured, a safety rating for the place, whether overnight parking is allowed, or any combination thereof. These static parking characteristics can be obtained from various sources such as city planning information (e.g., maps), parking business providing parking information for the spaces they manage, images of the parking spaces, manual tagging of parking spaces, crowd-sourced information of users supplying parking space characteristics as the parking availability predictor system is used, etc. When information is obtained from images, those images can be compared to images tagged by humans as occupied or vacant. A machine-learning algorithm can learn from the tagged pictures how to identify untagged pictures and determine whether a space is occupied or vacant. This mostly static information is used to support a parking availability predictor, such as process 400 of FIG. 4, in providing predictions suited to each user's search criteria.

At block 508, process 500 uses the information gathered above as input to create a statistical representation of parking occupancy that tells how long a given parking place tends to remain occupied and how long it tends to remain vacant. The statistical model can include both central tendencies (e.g., the means of these values) and a measure of dispersion (e.g., the standard deviations of these values). The representation can be trained by applied machine-learning or traditional statistical techniques to the dynamic information received in blocks 502 and 504. In some implementations, a multiple linear regression model can be drawn through the dynamic information received in blocks 502 and 504, and that model can be used to reliably predict future parking durations and occupancies. In other cases, such as where there are many independent features, then a higher dimensional model, e.g., a Ridge Regressor or Lasso Regressor, can be more reliable. The particular model that produces the best results is found by experimenting with the actual dynamic information available to that model. In yet further cases, a machine learning model can be trained to predict availability using the gathered availability/occupancy and timing information as training data.

Once created, when queried by a parking availability predictor, such as process 400 of FIG. 4, the parking occupancy model can apply its statistical representation to return a list of user-suitable parking, which can include when the parking is expected to become vacant and for how long it is expected to remain vacant as described above in relation to block 410 of FIG. 4. In some variations, the parking occupancy model can also include an estimated range of estimated times to vacancy (e.g., 10 minutes +/−8 minutes for one standard deviation) and/or a quality discounting factor. The latter is a reflection that information about parking received in blocks 502 and 504 may include too few data points to base a strong prediction.

In the scenario of FIG. 6, a user wishes to park in a small city. He invokes a parking-search application on his smart phone which presents a graphic UI 600 on the touch screen of the phone. The user tells the parking-search application via the selection panel 602 of the UI 600 that he wishes to park on the one-way street 606 somewhere near his destination point 608 that lies between a museum 610 and the user's favorite hot-dog stand 612. The user expects to arrive in the neighborhood of his destination point 608 in about one hour, and enters that information into the parking-search application.

For further specificity, the local parking-search application retrieves user-specified criteria from the user's parking profile and adds that to the information received from the UI 600. In the scenario of FIG. 6, this profile information includes the fact that the user generally drives a car into the city (and not, say, a motorcycle or bicycle), does not wish to walk for more than two blocks to his specified location, and does not park overnight in the city. The profile may also include an absolute filtering criterion such as, for example, an indication of whether to search for handicapped parking, which auto-fills check box 616. When check box 616 is not checked, the search will exclude from the results all handicapped parking. The profile criterion that the user drives a car is given the highest importance rating by the user. The other criteria have lower importance ratings. Any of these profile criteria can be overwritten by the user by checking or unchecking check box 616, but this time he chooses not to do so.

The local parking-search application packages the user-specified criteria into a request that it sends to a parking availability predictor 344 of FIG. 3 which may, in some variations, be implemented by process 400 described in FIG. 4.

When the parking availability predictor 344 receives the request from the parking-search application, it consults a parking occupancy model 346 that predictively models all of the public parking in this small city. Filtered by the user-specified criteria, the parking availability predictor 344 works in conjunction with the parking occupancy model 346 to list parking that: (i) is expected to become vacant near to the time when the user expects to arrive in the neighborhood of his destination point 608, (ii) is certainly not handicapped only, (iii) that can certainly accommodate a car, and (iv) and that is preferably no more than two blocks from the location 608. Because (iv) was given by the user a lesser importance rating, the parking occupancy model 346 may include parking that is a little farther away from destination point 608 if no more suitable spaces are predicted to be available.

The parking availability predictor 344 returns its results to the user's local parking-search application in the screen display 604. The small stars 614*a* through 614*e* are shown by the UI 600 on the display screen 604 of the user's smart phone to indicate parking that matches the user's specified criteria, including becoming available in about an hour when the user is expected to arrive in the neighborhood of his destination point 608.

The user notes the five possibilities 614*a-e* and drives toward the two 614*a*, 614*b* that are closest to his specified destination point 608. In some variations, the user's local parking-search application can feed this information to, or can be integrated into, a navigational application in the user's smart phone or automobile.

Figure 7:
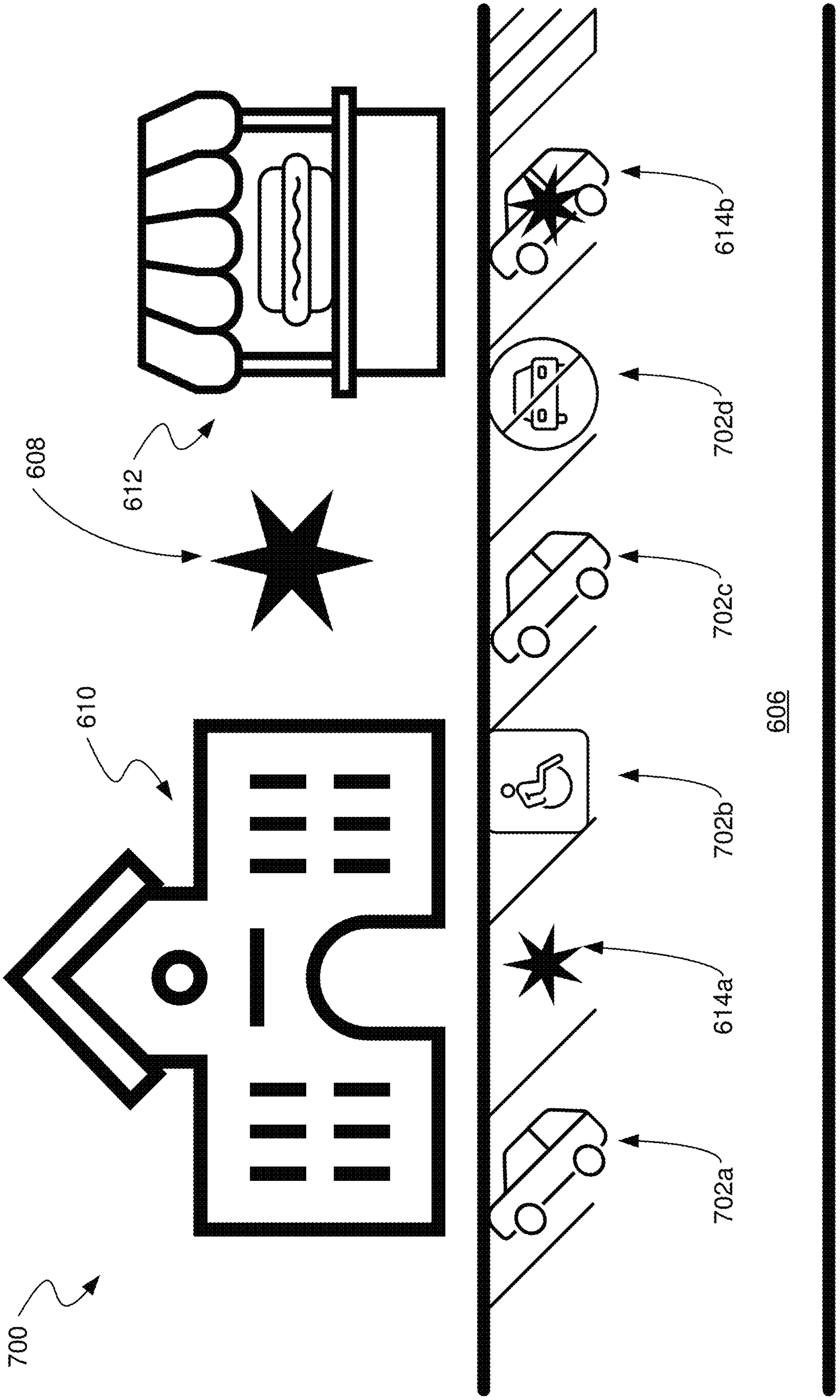
FIG. 7 is a conceptual diagram illustrating a parking situation within a small city.

FIG. 7 shows the scene 700 near the user's destination point 608 when he arrives there about an hour later. Cars occupy spaces 702*a* and 702*c*. Spaces 702*b* and 702*d*, though vacant, were not returned in response to the user's query because they are not suitable for him given his profile (702*b* is handicapped parking only; 702*d* does not allow cars). Space 614*a* was indicated in the response as likely to be vacant, and it is, so the user parks there. Space 614*b* was also indicated as likely to be vacant, but it is still occupied. This is because the parking availability predictions are statistically based and are not certain. In this scenario, the parking availability model predicted five spaces 614*a-e* that would likely be vacant, so even if spaces 614*a* and 614*b* were both still occupied, the user could drive a couple of blocks to 614*c-e* expecting that at least one of them would most likely be vacant.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for a computing system to provide a prediction of parking availability, the method comprising:

generating one or more imminent-vacancy scores for parking by applying a model to parking spaces, wherein the model was generated based at least on:

durations of parking-place occupancies for multiple parking places; or durations of parking-place vacancies for the multiple parking places; and providing, based on the one or more imminent-vacancy scores, a parking availability prediction, the providing comprising one or more of:

generating a map, based on the one or more imminent-vacancy scores, of expected vacancies;

providing directions to an area with the highest imminent-vacancy score of the one or more imminent-vacancy scores; or providing an expected wait time, for parking, determined based on the one or more imminent-vacancy scores;

wherein:

the providing the parking availability prediction comprises providing how well indicated parking spaces match search criteria provided by a user, the providing the parking availability prediction includes providing the directions to the area with the highest imminent-vacancy score, or the model was generated based at least on the durations of parking-place occupancies for multiple parking places and the durations of parking-place vacancies for the multiple parking places.

2. The method of claim 1, wherein the parking spaces are selected based on at least one factor including one or more of: size, parking place location, parking place handicapped status, parking place lighting status, parking place covered status, parking place payment requirements, parking place safety rating, maximum parking duration, or any combination thereof.

3. The method of claim 1, wherein the model is a machine learning model generated using training data created from the durations of parking-place occupancies for the multiple parking places or the durations of parking-place vacancies for the multiple parking places.

4. The method of claim 1, wherein the providing the parking availability prediction comprises providing how well the indicated parking spaces match the search criteria provided by the user.

5. The method of claim 4, wherein the search criteria includes one or more of: when the user wishes to park, a minimum space size, a maximum distance from a location, a space handicapped parking status, a space payment requirement, a desired time to park, or any combination thereof.

6. The method of claim 4, further comprising receiving, from the user, one or more importance rankings, each associated with one or more of the search criteria.

7. The method of claim 1, wherein the providing the parking availability prediction includes providing the expected wait time and the map of expected vacancies.

8. The method of claim 1, wherein the providing the parking availability prediction includes providing the directions to the area with the highest imminent-vacancy score.

9. The method of claim 1, wherein the model was generated based at least on the durations of parking-place occupancies for the multiple parking places and the durations of parking-place vacancies for the multiple parking places.

10. A non-transitory computer-readable storage medium storing instructions, for providing a prediction of parking availability, the instructions, when executed by a computing system, cause the computing system to:

generate one or more imminent-vacancy scores for parking by applying a model to parking spaces, wherein the model was generated based at least on:

durations of parking-place occupancies for multiple parking places; or durations of parking-place vacancies for the multiple parking places; and provide, based on the one or more imminent-vacancy scores, a parking availability prediction, the providing comprising one or more of:

generating a map, based on the one or more imminent-vacancy scores, of expected vacancies;

providing directions to an area with the highest imminent-vacancy score of the one or more imminent-vacancy scores; or providing an expected wait time, for parking, determined based on the one or more imminent-vacancy scores;

wherein:

the providing the parking availability prediction comprises providing how well indicated parking spaces match search criteria provided by a user, the providing the parking availability prediction includes providing the directions to the area with the highest imminent-vacancy score, or the model was generated based at least on the durations of parking-place occupancies for multiple parking places and the durations of parking-place vacancies for the multiple parking places.

11. The non-transitory computer-readable storage medium of claim 10, wherein the model was generated based at least on the durations of parking-place occupancies for the multiple parking places and the durations of parking-place vacancies for the multiple parking places.

12. The non-transitory computer-readable storage medium of claim 10, wherein the parking spaces are selected based on at least one factor including one or more of: size, parking place location, parking place handicapped status, parking place lighting status, parking place covered status, parking place payment requirements, parking place safety rating, maximum parking duration, or any combination thereof.

13. The non-transitory computer-readable storage medium of claim 10, wherein the model is a machine learning model generated using training data created from the durations of parking-place occupancies for the multiple parking places or the durations of parking-place vacancies for the multiple parking places.

14. The non-transitory computer-readable storage medium of claim 10, wherein the providing the parking availability prediction comprises providing how well the indicated parking spaces match the search criteria provided by the user.

15. The non-transitory computer-readable storage medium of claim 14, wherein the search criteria includes one or more of: when the user wishes to park, a minimum space size, a maximum distance from a location, a space handicapped parking status, a space payment requirement, a desired time to park, or any combination thereof.

16. The non-transitory computer-readable storage medium of claim 10, wherein the providing the parking availability prediction includes providing the expected wait time.

17. The non-transitory computer-readable storage medium of claim 10, wherein the providing the parking availability prediction includes providing the map of expected vacancies.

18. The non-transitory computer-readable storage medium of claim 10, wherein the providing the parking availability prediction includes providing the directions to the area with the highest imminent-vacancy score.

19. A computing system, for providing a prediction of parking availability, the comprising:

one or more processors; and one or more memories storing instructions that, when executed by the one or more processors, cause the computing system to:

generate one or more imminent-vacancy scores for parking by applying a model to parking spaces, wherein the model was generated based at least on:

durations of parking-place occupancies for multiple parking places; or durations of parking-place vacancies for the multiple parking places; and provide, based on the one or more imminent-vacancy scores, a parking availability prediction, the providing comprising one or more of:

generating a map, based on the one or more imminent-vacancy scores, of expected vacancies;

providing directions to an area with the highest imminent-vacancy score of the one or more imminent-vacancy scores; or providing an expected wait time, for parking, determined based on the one or more imminent-vacancy scores;

wherein:

the providing the parking availability prediction comprises providing how well indicated parking spaces match search criteria provided by a user, the providing the parking availability prediction includes providing the directions to the area with the highest imminent-vacancy score, or the model was generated based at least on the durations of parking-place occupancies for multiple parking places and the durations of parking-place vacancies for the multiple parking places.

20. The computing system of claim 19, wherein the providing the parking availability prediction includes providing the map of expected vacancies.

* * * * *